United States Patent
Jung

(10) Patent No.: US 8,891,468 B2
(45) Date of Patent: Nov. 18, 2014

(54) CONTENT-BASED NETWORK SYSTEM AND METHOD OF CONTROLLING TRANSMISSION OF CONTENT THEREIN

(75) Inventor: Sangsu Jung, Jinhae-si (KR)

(73) Assignee: Institute for Basic Science, Daejeon (KR)

( * ) Notice: Subject to any disclaimer, the term of this patent is extended or adjusted under 35 U.S.C. 154(b) by 146 days.

(21) Appl. No.: 13/485,051

(22) Filed: May 31, 2012

(65) Prior Publication Data
US 2013/0170442 A1 Jul. 4, 2013

(30) Foreign Application Priority Data

Dec. 29, 2011 (KR) .................. 10-2011-0145339

(51) Int. Cl.
*H04W 4/00* (2009.01)
(52) U.S. Cl.
USPC ........................................... 370/329
(58) Field of Classification Search
USPC ......... 370/229, 230–235, 328–339, 351, 389, 370/392, 395.5, 395.52, 401, 463–465
See application file for complete search history.

(56) References Cited

U.S. PATENT DOCUMENTS

| 6,006,264 | A * | 12/1999 | Colby et al. ................. 709/226 |
| 7,440,728 | B2 * | 10/2008 | Abhishek et al. ............ 455/41.2 |
| 8,477,627 | B2 * | 7/2013 | Bosloy et al. ................ 370/238 |
| 2007/0174255 | A1 * | 7/2007 | Sravanapudi et al. ............ 707/3 |
| 2008/0285578 | A1 * | 11/2008 | DeLay et al. ................ 370/412 |

* cited by examiner

*Primary Examiner* — Frank Duong
(74) *Attorney, Agent, or Firm* — Rabin & Berdo, P.C.

(57) ABSTRACT

Disclosed herein are a content-based network system and a method of controlling the transmission of content therein. The content-based network system includes a plurality of user terminals, a plurality of access points, a plurality of content origin servers, and a transmission control device. The plurality of access points is wirelessly connected to the plurality of user terminals. The plurality of content origin servers provides content to the access points. The transmission control device determines the priority of transmission of the content based on the characteristics of the content and allocates channels and sets interfaces based on the determined priority of transmission of the content.

18 Claims, 3 Drawing Sheets

CONTENT-BASED NETWORK SYSTEM AND METHOD OF CONTROLLING TRANSMISSION OF CONTENT THEREIN

BACKGROUND OF THE INVENTION

1. Field of the Invention

The present invention relates generally to a content-based network system and a method of controlling the transmission of content therein and, more particularly, to a content-based network system and a method of controlling the transmission of content therein, which analyze content, prioritize the content based on the importance and utilization of the content, and set channels and interfaces, thereby improving the efficiency of use of the channels, and which provide a channel control and interface use method for a single hop and multiple hops, thereby minimizing waste of resources of a wireless network environment in which there is a limitation on a shared medium.

2. Description of the Related Art

The Internet which is currently being used has an Internet Protocol (IP)-based end-to-end connection structure. The IP-based Internet structure is dependent on the addresses of network devices because it works based on connections between network devices. Accordingly, when the addresses of network devices vary, there are cases where it is difficult to continuously download content.

In particular, the IP-based Internet structure has a client-server structure, and therefore the addresses of network devices should be searched so as to search for content which is desired to be downloaded. Furthermore, in the client-server structure, both a network device which provides content and a network device which requests the content should detect a server, and therefore dependence on the server increases. In this case, content may not be continuously provided in proportion to the number of network devices which are connected to the server.

Accordingly, a content-based networking technology was developed which was capable of continuously providing content regardless of the number of network devices. Content-based networking refers to networking in which data is not transmitted based on an existing IP address system but is transmitted by allocating a virtual code to content itself and mapping the virtual code to an address.

This technology is a system which enables multimedia and a variety of large amounts of content to be efficiently managed and appropriately transmitted to destinations even when they are present over a network. However, the current technology focuses on the distribution of content simply using a data center or a cache server without interworking with access points.

SUMMARY OF THE INVENTION

Accordingly, the present invention has been made keeping in mind the above problems occurring in the prior art, and an object of the present invention is to provide a content-based network system and a method of controlling the transmission of content therein, which analyze content, prioritize the content based on the importance and utilization of the content, and set channels and interfaces, thereby improving the efficiency of use of the channels, and which provide a channel control and interface use method for a single hop and multiple hops, thereby minimizing waste of resources of a wireless network environment in which there is a limitation on a shared medium.

In order to accomplish the above object, the present invention provides a content-based network system, including a plurality of user terminals; a plurality of access points wirelessly connected to the plurality of user terminals; a plurality of content origin servers configured to provide content to the access points; and a transmission control device configured to determine the priority of transmission of the content based on the characteristics of the content and to allocate channels and set interfaces based on the determined priority of transmission of the content.

The transmission control device may analyze the characteristics of the content on at least one of an MAC layer, a network layer, and an application layer.

The transmission control device may include a content analysis unit for analyzing at least one of a type of content, a frequency of use of the content, a frequency of request of the content, whether the content is urgent content, and whether the content is finance-related content.

The transmission control device may include a multi-channel control unit for scheduling the channels based on the priority of transmission of the content.

The transmission control device may include a multi-interface control unit for determining times of operation of the interfaces based on the priority of transmission of the content and allocating the interfaces to the content.

The transmission control device may include a negotiation protocol unit for determining whether to use channels and interfaces to transmit content based on the priority of transmission of the content in a single or multiple hop situation, and agreeing on it.

In order to accomplish the above object, the present invention provides a method of controlling transmission of content in a content-based network system, the content-based network system including a plurality of user terminals, a plurality of access points wirelessly connected to the plurality of user terminals, and a plurality of content origin servers configured to provide content to the access points, the method including determining priority of transmission of the content based on characteristics of the content; allocating transmission channels based on the priority of transmission of the content; and setting interfaces based on the priority of transmission of the content.

The determining priority of transmission of the content based on characteristics of the content may include analyzing the characteristics of the content on at least one of an MAC layer, a network layer, and an application layer.

The determining priority of transmission of the content based on characteristics of the content may include determining the priority of transmission of the content based on at least one of a type of content, a frequency of use of the content, a frequency of request of the content, whether the content is urgent content, and whether the content is finance-related content.

The allocating transmission channels based on the priority of transmission of the content may include scheduling available channels based on the priority of transmission of the content.

The allocating transmission channels based on the priority of transmission of the content may include allocating higher quality channels to higher priority content.

The method may further include determining whether to use channels and interfaces to transmit content based on the priority of transmission of the content in a single or multiple hop situation, and agreeing on it; and transmitting the content in the single or multiple hop situation for which the agreement has been made.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Preferred embodiments of the present invention will be described in detail below with reference to the accompanying drawings. Herein, terms or words used in the present specification and claims should not be limitedly interpreted as common or dictionary meanings, and should be interpreted as meanings and concepts which accord with the technical spirit of the invention based on the principle that an inventor may appropriately define the concepts of terms and words in order to describe his/her invention the best way.

Accordingly, since the configurations illustrated in the present specification and the drawings are merely preferred embodiments of the present invention and are not representative of the overall technical spirit of the present invention, it should be appreciated that there may be a variety of equivalents and variations which can replace the above embodiments or the elements thereof at the time when this application is filed.

Figure 1:
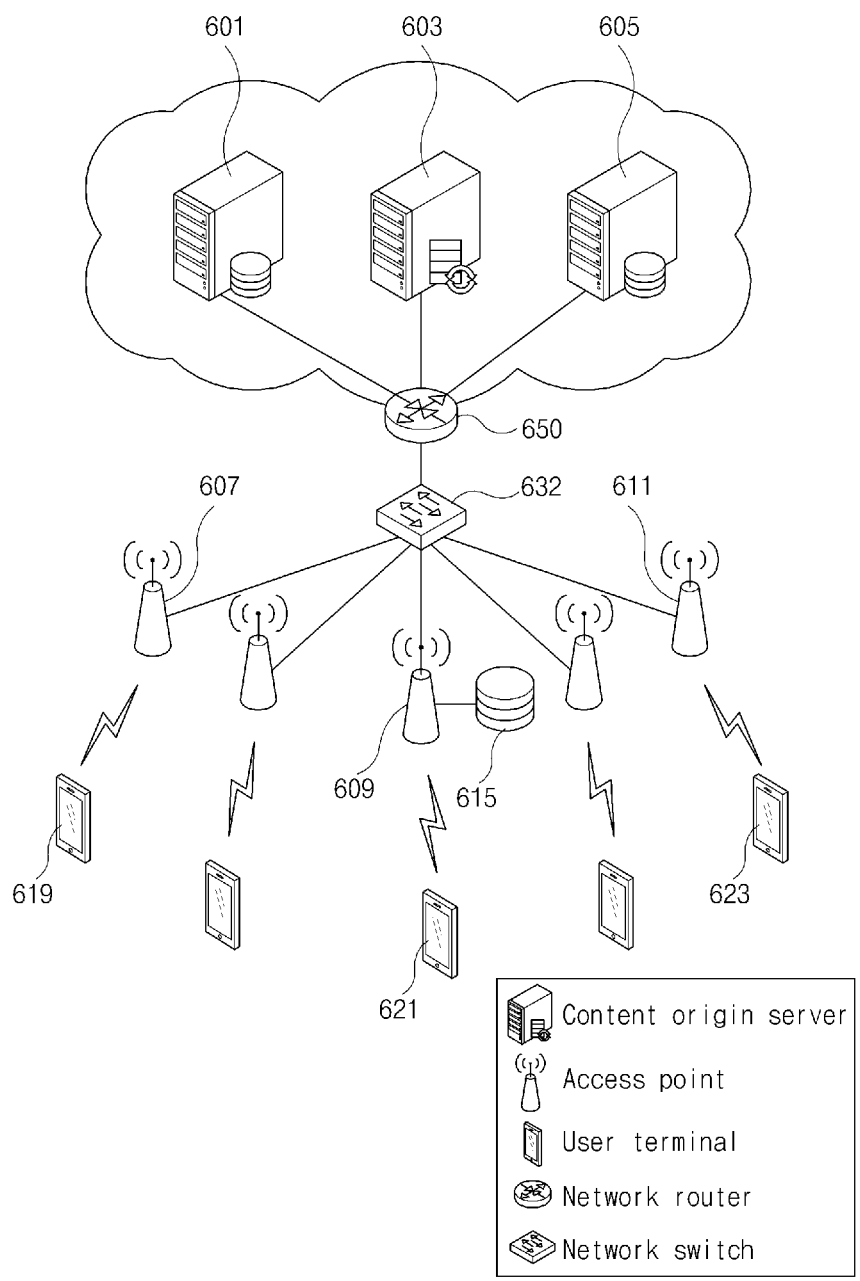
FIG. 1 is a diagram showing the configuration of a content-based network system according to an embodiment of the present invention.

FIG. 1 is a diagram showing the configuration of a content-based network system according to an embodiment of the present invention.

As shown in FIG. 1, the content-based network system includes a plurality of content origin servers 601, 603, and 605 for distributing content, a network router 650 for separating a network, a network switch 632 for distributing the network, a plurality of access points 607, 609, and 611 for wirelessly providing content transmission service to users, and a plurality of user terminals 619, 621, and 623 for providing services via the plurality of access points.

The content origin servers 601, 603, and 605 provide content over a public network such as the Internet.

The network router 650 separates the network into an internal network and an external network. Content is transmitted to the internal network by the network switch 633.

In the case of a wireless network, content is transmitted to the user terminals 619, 621, and 623 by the access points 607, 609, and 611 connected to the network switch 633, after the verification of identity.

The user terminals 619, 621, and 623 each connect with one or more access points which are selected from among access points within a transmission range and which do not cause its total transmission bandwidth to be exceeded. The user terminal 621 transmits a connection request signal to the access points 607, 609, and 611. The available ones of the access points 607, 609, and 611 which have received the connection request signal transmit connection available signals to the user terminal 619, 621, or 623. The user terminal which has received the connection available signals from the access points assigns an additional address to a network device, and forms a multi-transmission environment along with the access points.

The content-based network system configured as described above adopts the concept of a content publisher and the concept of a content consumer who receives and consumes content, instead of a transmitter and a receiver. The network performs routing using content names instead of IP addresses, and the network router stores specific data when necessary and distributes content to new adjacent consumers who request content.

Here, the content-based network system according to an embodiment of the present invention classifies content and then prioritizes the content based on characteristics such as importance and utilization, allows interworking with transmission channels and interfaces based on the priority of the content, and causes a plurality of nodes to agree on the use of channels and interfaces based on the priority of the content.

Figure 2:
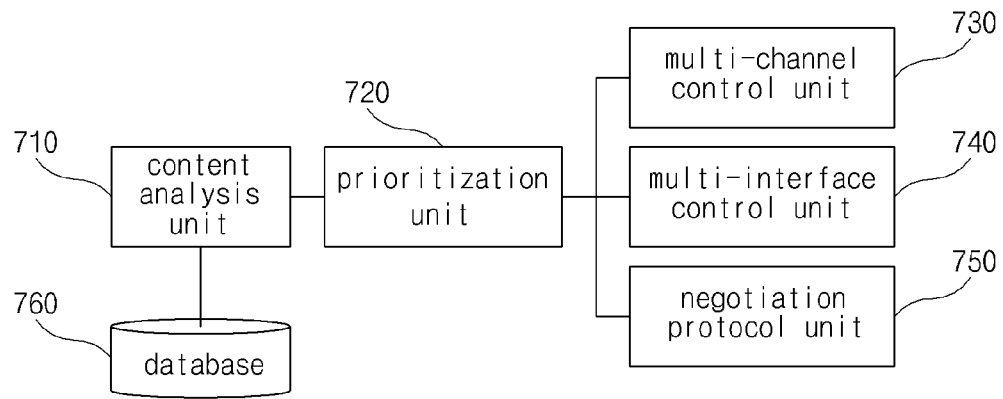
FIG. 2 is a block diagram of the transmission control device of the content-based network system according to an embodiment of the present invention.

FIG. 2 is a block diagram of the transmission control device of the content-based network system according to an embodiment of the present invention.

As shown in FIG. 2, the transmission control device includes a content analysis unit 710 for analyzing content, a database 760 for storing content-related information, a prioritization unit 720 for prioritizing the transmission of the content based on the results of the analysis of the content, a multi-channel control unit 730 for allocating channels based on the determined priority, a multi-interface control unit 740 for allocating interfaces based on the determined priority, and a negotiation protocol unit 750 for causing a plurality of nodes to agree on the use of channels and interfaces based on the content.

The content analysis unit 710 analyzes characteristics such as the frequency of use of content, the frequency of request of content, the extent of urgency of content, and the contents of content. The content analysis unit 710 may classify the type of content on a MAC layer, a network layer, or an application layer.

The database 760 stores information related to the type of content, the use of channels, and the use of interfaces.

The prioritization unit 720 prioritizes content. The priority may be determined based on the frequency of use of content or the frequency of request of content, or may be set based on situations, such as whether content is urgent content or whether content is finance-related content. The priority may be flexible priority which varies depending on the situation, or fixed priority which does not vary depending on the situation. For example, the priority based on the frequency of use of content and/or the frequency of request is flexible priority which varies depending on the situation. This type of priority may rise when the frequency of use increases for each day, and may lower when the frequency of use decreases for each day. However, urgent content or finance-related content may have fixed priority which does not vary depending on the situation. Such priority is stored in the distributed database or server of the network. When a user requests information about the priority, the priority may be determined by inquiring about the priority from the database or server, or by inquiring about the priority from an adjacent database or server if the priority is not found in the former database or server.

The multi-channel control unit 730 allocates channels based on the priority of content. The multi-channel control unit 730 divides multiple channels into a control channel and data channels, and attempts to transmit content.

Here, the control channel is a channel over which information about the control of content transmission and medium access is exchanged. In a specific situation, the control channel may be used to transmit data. The data channels are channels over which data is transmitted in response to a request for content transmission from a user terminal.

The multi-channel control unit 730 determines the sequence and periods of the use of the multiple data channels so as to allow data to be transmitted over control channels. The multi-channel control unit 730 allocates higher quality channels to higher priority content based on the importance and utilization of the content. For this purpose, the multi-channel control unit 730 can search for higher quality channels by continuously monitoring the status of wireless channels.

The multi-interface control unit 740 uses one of the multiple interfaces for the control channel. If the control channel is used to transmit data, the interface set for the control channel is also used to transmit data. The multiple interfaces except for the interface which is used for the control channel are used to transmit data. The multi-interface control unit 740 may allocate multiple interfaces to multiple channels in a one-to-one or one-to-many correspondence, in which case it allocates interfaces after taking into consideration the priority of content.

The negotiation protocol unit 750 determines whether to use channels and interfaces to transmit content based on the priority of the corresponding content in a single or multiple hop situation, and agrees on it.

According to the above configuration, the transmission control device of the present invention may analyze content, and set channels and interfaces based on the results of the analysis. Thereby, an urgent service can be rapidly provided because whether channels are available is determined based on the importance and utilization of content, and the utilization of channels can be maximized because the channels are scheduled for the transmission of content if there are multiple available channels. Furthermore, wireless network resources are prevented from being wasted because a channel control and interface use method is presented for single and multiple hop situations.

Figure 3:
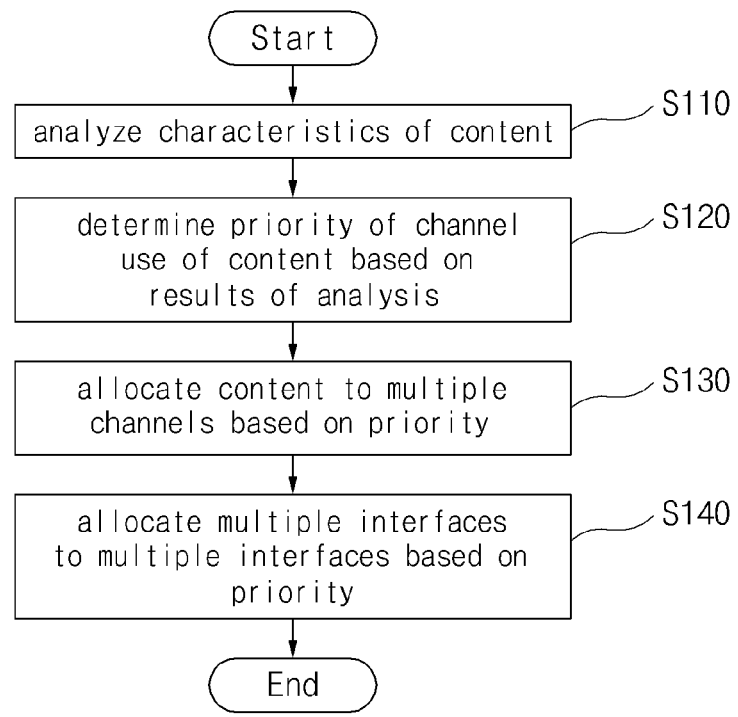
FIG. 3 is a flowchart illustrating the channel and interface control of the content-based network system according to an embodiment of the present invention.

FIG. 3 is a flowchart illustrating the channel and interface control of the content-based network system according to an embodiment of the present invention.

First, the characteristics of content to be transmitted are analyzed at step S110, and the priority of channel use is determined based on the results of the analysis and the importance and utilization of the content at S120. The importance and utilization of the content may be determined based on the frequency of use of content, the frequency of request of content, the urgency of content, and the relationship of content with finance. The priority may be stored in the distributed database or server of the network. Accordingly, when a user requests information about the priority, the priority may be determined by inquiring about the priority from the database or server, or by inquiring about the priority from an adjacent database or server if the priority is not found in the former database or server.

The content is allocated to multiple channels based on the priority at step S130. The times of the occupation of the data channels may be determined based on the priority of the content, and higher quality channels are allocated higher priority content. Here, in order to increase the efficiency of the transmission of the content, superior channels can be searched for by continuously monitoring the status of channels.

Thereafter, multiple interfaces are allocated to multiple channels based on the priority at step S140. Here, the multiple interfaces may be allocated to the multiple channels in a one-to-one or one-to-many correspondence.

Figure 4:
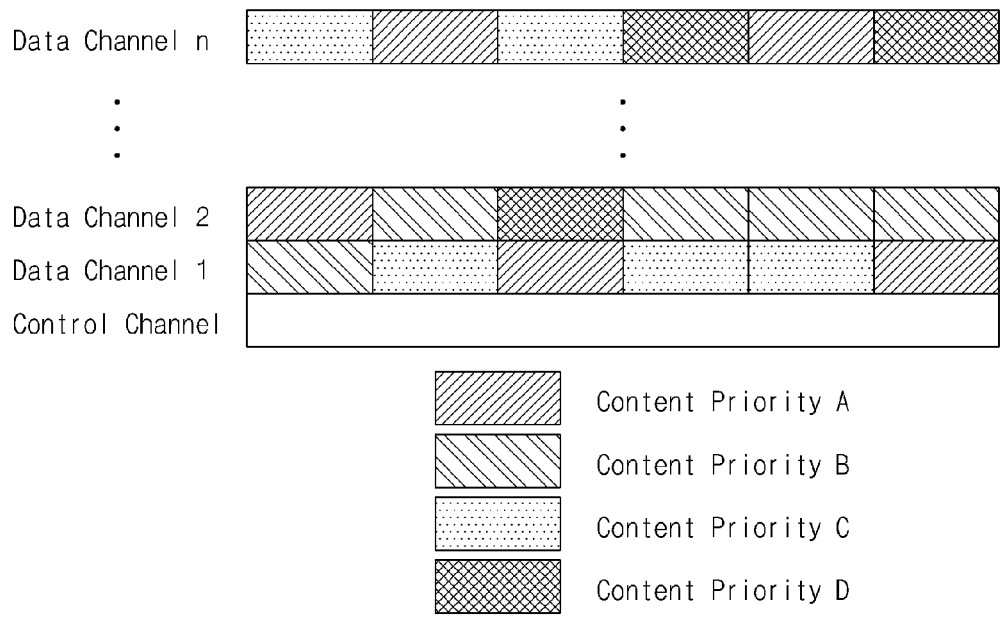
FIG. 4 is a diagram showing the channel allocation status of the content-based network system according to an embodiment of the present invention.

FIG. 4 is a diagram showing the channel allocation status of the content-based network system according to an embodiment of the present invention.

As shown in FIG. 4, multiple channels are divided into a control channel and data channels, and the sequence of the priorities of a plurality of pieces of content is "A→B→C→D."

Higher quality channels are allocated to higher priority content, and the times of the occupation of the data channels are determined based on the sequence of the priorities of the content (A→B→C→D).

In accordance with the present invention, a content-based network system and a method of controlling the transmission of content therein analyze content, prioritize the content based on the importance and utilization of the content, and set channels and interfaces, thereby improving the efficiency of use of the channels, and provide a channel control and interface use method for a single hop and multiple hops, thereby minimizing waste of resources of a wireless network environment in which there is a limitation on a shared medium.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A content-based network system, comprising:
a plurality of user terminals;
a plurality of access points wirelessly connected to the plurality of user terminals;
a plurality of content origin servers configured to provide content to the access points; and
a transmission control device configured to determine a determined priority of transmission of the content based on characteristics of the content, the transmission control device being further configured to allocate channels and set interfaces based on the determined priority of the transmission of the content, the transmission control device being configured to determine the determined priority by determining whether the content has a fixed priority which never varies regardless of a current situation, the channels including both of
a data channel over which the content is transmitted, and
a control channel over which information about a control of the transmission of the content is transmitted.

2. The content-based network system of claim 1, wherein the transmission control device analyzes the characteristics of the content on at least one selected from the group consisting of a MAC layer, a network layer, and an application layer.

3. The content-based network system of claim 1, wherein the transmission control device comprises a content analysis unit for analyzing at least one selected from the group consisting of a type of the content, a frequency of use of the content, a frequency of request of the content, whether the content is urgent content, and whether the content is finance-related content.

4. The content-based network system of claim 1, wherein the transmission control device comprises a multi-channel control unit for scheduling the channels based on the determined priority of the transmission of the content.

5. The content-based network system of claim 1, wherein the transmission control device comprises a multi-interface control unit for
- determining times of operation of the interfaces based on the determined priority of the transmission of the content, and
- allocating the interfaces to the content based on the determined priority of the transmission of the content.

6. The content-based network system of claim 1, wherein the transmission control device comprises a negotiation protocol unit for determining whether to use the channels and the interfaces to transmit the content, based on the determined priority of the transmission of the content, in a single hop situation or a multiple hop situation.

7. A method of controlling transmission of content in a content-based network system, the content-based network system including a plurality of user terminals, a plurality of access points wirelessly connected to the plurality of user terminals, a transmission control device and a plurality of content origin servers configured to provide content to the access points, the method comprising:
- determining, by using the transmission control device, a determined priority of transmission of the content based on characteristics of the content by determining whether the content has a fixed priority which never varies regardless of a current situation;
- allocating transmission channels based on the determined priority of the transmission of the content by using the transmission control device, the channels including both of
  - a data channel over which the content is transmitted, and
  - a control channel over which information about a control of the transmission of the content is transmitted; and
- setting interfaces based on the determined priority of the transmission of the content by using the transmission control device.

8. The method of claim 7, wherein the determining a determined priority of transmission of the content based on characteristics of the content comprises analyzing the characteristics of the content on at least one selected from the group consisting of a MAC layer, a network layer, and an application layer.

9. The method of claim 7, wherein the determining a determined priority of transmission of the content based on characteristics of the content comprises determining the determined priority of the transmission of the content based on at least one selected from the group consisting of a type of content, a frequency of use of the content, a frequency of request of the content, whether the content is urgent content, and whether the content is finance-related content.

10. The method of claim 7, wherein the allocating transmission channels based on the determined priority of the transmission of the content comprises scheduling available channels of the transmission channels based on the determined priority of the transmission of the content.

11. The method of claim 7, wherein the allocating transmission channels based on the determined priority of the transmission of the content comprises allocating higher quality channels of the transmission channels to higher priority content.

12. The method of claim 7, further comprising:
- determining, based upon the determined priority of the transmission of the content, to transmit the content in a single hop situation or a multiple hop situation; and
- transmitting the content by using the allocated transmission channels and the set interfaces in the determined single or multiple hop situation.

13. The method of claim 7, further comprising:
- receiving a request for information about the determined priority of the transmission from a user; and
- after the receiving, transmitting the information about the determined priority of the transmission.

14. The method of claim 13, wherein in the transmitting the information about the determined priority of the transmission, the information about the determined priority of the transmission is transmitted on the control channel.

15. The method of claim 7, further comprising:
- transmitting all data of the content over the data channel; and
- during all of the transmitting, the control channel does not transmit any data of the content.

16. The content-based network system of claim 1, wherein the transmission control device is configured to transmit information about the determined priority of the transmission in response to a request for the information about the determined priority of the transmission from a user.

17. The content-based network system of claim 16, wherein the transmission control device is configured to transmit the information about the determined priority of the transmission on the control channel.

18. The content-based network system of claim 1, wherein all data of the content is transmitted over the data channel, and during all of the transmitting of all of the data, the control channel does not transmit any data of the content.

* * * * *